Patented Jan. 14, 1947

2,414,120

UNITED STATES PATENT OFFICE 2,414,120

PRODUCTION OF VANILLYL ALCOHOL

Irwin A. Pearl, Appleton, Wis., assignor, by mesne assignments, to Cola G. Parker, Neenah, Wis., as trustee No Drawing. Application May 17, 1944,
Serial No. 536,043

6 Claims. (Cl. 260—613)

My invention relates to the production of vanillyl alcohol and related products and includes among its objects and advantages a simple and expeditious procedure for producing such alcohol in quantity from vanillin, in the monomeric, or unpolymerized, condition.

The ordinary Cannizzaro reaction is conveniently written as follows:

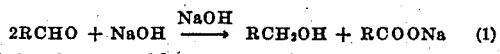

It is also possible to react two different aldehydes in what is known as the crossed Cannizzaro reaction as follows:

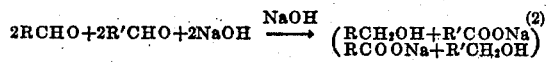

When R' is H this equation becomes:

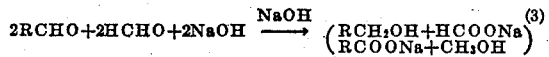

However, it is generally known that vanillin, syringaldehyde, salicylaldehyde, ortho-vanillin, paradimethylaminobenzaldehyde, and other compounds of similar structure, are exceptions to the general rule, being aldehydes which will not take part in any of Reactions 1, 2 and 3.

In my copending application, Serial No. 536,040, filed May 17, 1944, I have disclosed the effectiveness of catalytic silver to cause Reaction 1 to take place with aldehydes which otherwise would not react. However, in the procedures outlined in that application using vanillin, the vanillyl alcohol is itself polymerized, according to the following equation.

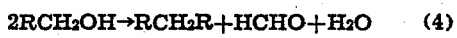

I have discovered a way of performing Equation 3 without polymerizing the vanillyl alcohol. Furthermore the vanillin is all changed to the alcohol and none of it to vanillic acid.

An example according to the present invention is as follows:

Example I 24 parts (0.6 mole) of sodium hydroxide and 21 parts (0.2 weight atom) of catalytic silver, were subjected to intense mechanical mixing in 200 parts of water, while a slurry made up of 15.2 parts (0.1 mole) of vanillin and 50 parts (0.5 mole) of 37% formalin solution were added a little at a time. Mixing was continued for about thirty minutes. No heat was added but the temperature rose, at first slowly and then more rapidly, to near the boiling point.

The reaction mass was filtered, acidified with carbon dioxide, saturated with sodium chloride, and extracted with ether to secure 12.7 parts of vanillyl alcohol which was found to be entirely monomeric and unpolymerized and represented 82.5% of the original vanillin.

Acidification of the remaining material with hydrochloric acid and extraction with ether yielded 1.6 parts of resinous vanillyl alcohol representing 10.4% of the original vanillin. The residue was found to contain vanillic acid representing 7% of the original vanillin.

Example II

The vanillin and formalin and silver of Example I were subjected to intense mixing in about 175 parts of water and the sodium hydroxide dissolved in 25 parts of water was added slowly to the other ingredients. After the addition was completed, continued agitation for thirty minutes had the same result as in Example I.

The known substances to which the invention is applicable include the 4-hydroxy-, 2-hydroxy-, 4-amino-, 2-amino-, 4-substituted-amino- and 2-substituted-amino-benzaldehydes and their derivatives. The silver used was the catalytic silver resulting from immediate spontaneous reduction of nascent silver oxide, as disclosed in my copending application, Serial No. 536,042, filed May 17, 1944.

In both the foregoing examples the silver acts as a catalyst only and no significance attaches to the molar proportions employed.

Without further elaboration, the foregoing will so fully explain my invention that others may readily adapt the same for use under various conditions of service.

I claim:

1. The production of unpolymerized vanillyl alcohol which comprises reacting vanillin in the presence of catalytic silver, with caustic alkali in the presence of an excess of caustic alkali and of formaldehyde; said reaction being conducted in the presence of sufficient water to dissolve the soluble reagents.

2. The production of unpolymerized vanillyl alcohol which comprises reacting vanillin in the presence of catalytic silver, with caustic alkali in the presence of an excess of caustic alkali and of formaldehyde; said reaction being conducted in the presence of water.

3. The production of unpolymerized vanillyl alcohol which comprises reacting vanillin in the presence of catalytic silver, with caustic alkali in the presence of an excess of caustic alkali and of formaldehyde.

4. The production of the derived unpolymerized alcohol from an aldehyde selected from the class, vanillin, syringaldehyde, salicylaldehyde, ortho-vanillin and paradimethylaminobenzaldehyde, which comprises: reacting the aldehyde in the presence of catalytic silver, with caustic alkali in the presence of an excess of caustic alkali and of formaldehyde; said reaction being conducted in the presence of sufficient water to dissolve the soluble reagents.

5. The production of the derived unpolymerized alcohol from an aldehyde selected from the class, vanillin, syringaldehyde, salicylaldehyde, ortho-vanillin, and paradimethylaminobenzaldehyde, which comprises: reacting the aldehyde in the presence of catalytic silver, with caustic alkali in the presence of an excess of caustic alkali and of formaldehyde; said reaction being conducted in the presence of water.

6. The production of the derived unpolymerized alcohol from an aldehyde selected from the class, vanillin, syringaldehyde, salicylaldehyde, ortho-vanillin, and paradimethylaminobenzaldehyde, which comprises: reacting the aldehyde in the presence of catalytic silver, with caustic alkali in the presence of an excess of caustic alkali and of formaldehyde.

IRWIN A. PEARL.